US011724693B2

(12) United States Patent
Iyer et al.

(10) Patent No.: US 11,724,693 B2
(45) Date of Patent: Aug. 15, 2023

(54) SYSTEMS AND METHODS TO PREVENT VEHICULAR MISHAPS

(71) Applicant: Ford Global Technologies, LLC, Dearborn, MI (US)

(72) Inventors: Vidhya Iyer, Sunnyvale, CA (US); Anuja Anil Shirsat, Mountain View, CA (US); Shounak Athavale, San Jose, CA (US); Eric Wingfield, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 17/171,106

(22) Filed: Feb. 9, 2021

(65) Prior Publication Data
US 2022/0250613 A1 Aug. 11, 2022

(51) Int. Cl.
*B60W 30/09* (2012.01)
*G08G 1/16* (2006.01)
(Continued)

(52) U.S. Cl.
CPC ........ *B60W 30/09* (2013.01); *B60W 30/0956* (2013.01); *B60W 50/16* (2013.01);
(Continued)

(58) Field of Classification Search
CPC ............ B60W 30/09; B60W 60/0015; B60W 30/0956; B60W 50/16; B60W 2554/4041;
(Continued)

(56) References Cited

U.S. PATENT DOCUMENTS 6,472,978 B1 * 10/2002 Takagi ................... G08G 1/005
340/904
9,401,028 B2 7/2016 Kuehnle et al.
(Continued)

FOREIGN PATENT DOCUMENTS

CN 103927904 A * 7/2014
KR 10-1354049 B1 * 2/2014
WO 2018094374 A1 5/2018

OTHER PUBLICATIONS

Hussein et al., "P2V and V2P Communication for Pedestrian Warning on the basis of Autonomous Vehicles", Nov. 2016, IEEE 19th International Conference on Intelligent Transportation Systems (ITSC-2016) (Year: 2016).*

(Continued)

*Primary Examiner* — Tarek Elarabi
(74) *Attorney, Agent, or Firm* — Brandon Hicks; Eversheds Sutherland (US) LLP

(57) ABSTRACT

Example embodiments described in this disclosure are generally directed to systems and methods for preventing vehicular mishaps. In an example method, an object detector mounted on a building or a roadside fixture, detects an object in a detection coverage area of the object detector. The object is undetectable by a collision avoidance system of a vehicle. The object detector conveys information about the object to a supervisory computer. The information can include, for example, a location and/or a direction of travel of the object (if the object is moving). The supervisory computer evaluates the information and transmits an alert to the collision avoidance system of the vehicle, so as to prevent a collision between the vehicle and the object. In an example situation, where the object is a pedestrian, the supervisory computer may also transmit a warning alert to a personal communication device of the pedestrian.

17 Claims, 4 Drawing Sheets

(51) Int. Cl.
*B60W 30/095* (2012.01)
*G08G 1/01* (2006.01)
*B60W 60/00* (2020.01)
*B60W 50/16* (2020.01)

(52) U.S. Cl.
CPC ....... B60W 60/0015 (2020.02); G08G 1/0116 (2013.01); G08G 1/166 (2013.01); *B60W 2554/4029* (2020.02); *B60W 2554/4041* (2020.02); *B60W 2554/4044* (2020.02); *G08G 1/164* (2013.01)

(58) Field of Classification Search
CPC .. B60W 2554/4029; B60W 2554/4044; G08G 1/0116; G08G 1/166; G08G 1/164
See application file for complete search history.

(56) References Cited

U.S. PATENT DOCUMENTS

| | | |
|---|---|---|
| 10,386,192 B1 | 8/2019 | Konrardy et al. |
| 2013/0253816 A1* | 9/2013 | Caminiti ................. B60R 21/34 701/301 |
| 2015/0210279 A1* | 7/2015 | Agnew ............... B60W 10/184 701/48 |
| 2015/0254985 A1* | 9/2015 | Fisher ............... B60W 30/0953 348/148 |
| 2017/0255843 A1 | 9/2017 | Elwart et al. |
| 2020/0180502 A1* | 6/2020 | Mitsuya ................. G08G 1/166 |
| 2022/0178112 A1* | 6/2022 | Brattberg ............. B60W 30/09 |
| 2022/0222475 A1* | 7/2022 | Oesterling ............. G08G 1/166 |

OTHER PUBLICATIONS

Minchul Lee et al, "Collision risk assessment of occluded vehicle based on the motion predictions using the precise road map", Robotics and Autonomous Systems, May 8, 2018, PII:S0921-8890(17)30874-6, (2018) https://doi.org/10.1016/j.robot.2018.05.005, 41 pages.

* cited by examiner

SYSTEMS AND METHODS TO PREVENT VEHICULAR MISHAPS

BACKGROUND

A radar device is one of several types of detection devices that may be provided in a vehicle for detecting objects in the vicinity of the vehicle. Another example of a detection device is a camera. The camera captures images of various objects near a vehicle (such as a pedestrian or another vehicle), and conveys the images to a computer in the vehicle. The computer analyzes the images and assists the vehicle perform certain actions.

However, detection devices such as the radar device or camera may be unable to detect certain objects in some situations. For example, the radar signals emitted by the radar device may be blocked by an intervening object (a building or another vehicle, for example). As another example, a camera mounted on a vehicle may fail to capture an image that is out of sight of the camera due to an intervening object such as another vehicle or a building.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
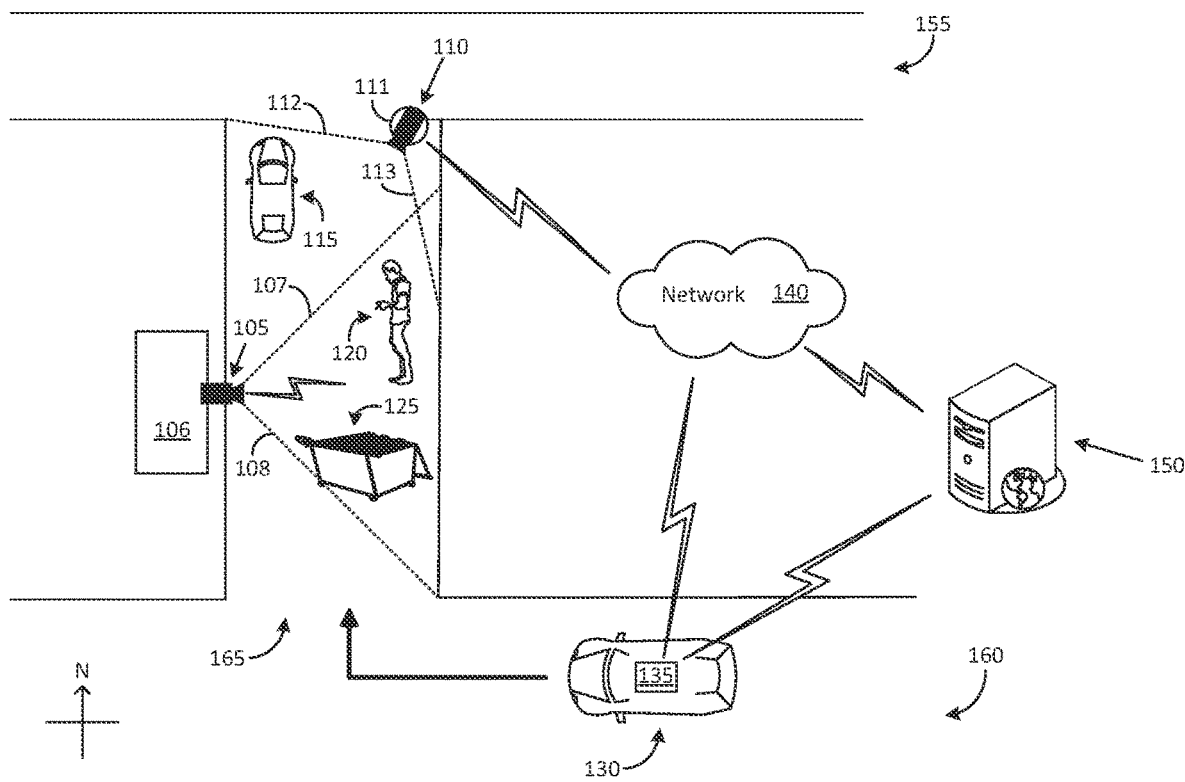
FIG. 1 shows an example scenario in accordance with the disclosure where one or more objects are undetectable by a collision avoidance system of a vehicle.

In terms of a general overview, certain embodiments are generally directed to systems and methods for preventing vehicular mishaps. In an example method, an object detector mounted on a building or a roadside fixture detects an object in a detection coverage area of the object detector. The object may be undetectable by a collision avoidance system of a vehicle. The object detector conveys information about the object to a supervisory computer. The information can include, for example, a location of the object and/or a direction of travel of the object (if the object is an animate object). The supervisory computer evaluates the information and transmits an alert to the collision avoidance system of the vehicle, so as to prevent a collision between the vehicle and the object. The collision avoidance system may be a part of a driver-operated vehicle or an autonomous vehicle. In an example scenario, where the object is a pedestrian, the supervisory computer may also transmit a warning alert to a personal communication device of the pedestrian. In another example scenario, where the vehicle is a driver-operated vehicle, the supervisory computer may transmit a warning to the driver via a buzzer in the vehicle, a haptic transducer in the vehicle, and/or an infotainment system (e.g., HMI) in the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "supervisory computer" as used in this disclosure can refer to any of various types of computers that may be located in various places for carrying out various kinds of functions. The various types of computers can include computing devices such as, for example, a desktop computer, a laptop computer, a standalone computer, a cloud computer, a wearable device (a smartwatch, for example), and/or a smartphone. In accordance with functions performed, the computers may be referred to by various names such as, for example, a server computer, a client computer, an edge computer, or a network computer. Words such as "wireless" or "wirelessly" as used herein are not intended to preclude other forms of communication such as optical communications and wired communications. The examples provided herein encompass such alternative communication technologies. The word "vehicle" as used herein encompasses, for example, cars, vans, sports utility vehicles, trucks, electric vehicles, gasoline vehicles, hybrid vehicles, driver-operated vehicles, and autonomous vehicles. The phrase "personal communication device" as used herein refers to any of various types of devices that can be carried around by an individual. A few examples of personal communication devices can include: a cellular phone, a smartphone, a tablet computer, a phablet (phone plus tablet computer), and a portable computer. The word "collision" as used herein encompasses two objects that make contact with each other accidentally or non-accidentally. As such the word should be understood to encompass "accidents." The phrase "vehicular mishap" as used herein encompasses any form of undesirable contact between a vehicle and any object (another vehicle, an individual, a building, a roadside fixture, etc.). It should also be understood that the word "example" as used herein is intended to be non-exclusionary and non-limiting in nature. The word indicates one among several examples, and no undue emphasis or preference is being directed to the particular example being described.

FIG. 1 shows an example scenario in accordance with the disclosure where one or more objects are undetectable by a collision avoidance system 135 of a vehicle 130. The vehicle 130 is traveling west on a road 160 and its intended travel path includes a right turn into an alley 165 that interconnects the road 160 with a road 155.

In other scenarios in accordance with the disclosure, the vehicle 130 can follow any of various other travel paths and travel on any of various travel surfaces. More particularly, some or all of the example objects shown in the alley 165 may be present on other roads and travel surfaces that may be traversed by the vehicle 130 (a highway, a driveway, an open-air parking lot, or a parking lot inside a building, etc.). The roads and travel surfaces may be located in any of various locations (a housing area, a public area, a private area, or an educational campus, etc.).

The collision avoidance system 135 provided in the vehicle 130 can include various components such as, for example, a vehicle controller, a communications system, and a sensor system. The vehicle controller may control various operations of the vehicle 130 (fuel injection, speed control, braking, cruise control, etc.) either directly (when the vehicle 130 is an autonomous vehicle) or indirectly (by providing assistance to a driver of the vehicle 130 when the vehicle 130 is a driver-operated vehicle).

The communications system of the vehicle 130 may allow the collision avoidance system 135 to communicate with various devices such as, for example, a supervisory computer 150. In an example implementation, the collision avoidance system 135 may communicate with the supervisory computer 150 via a network 140. Various communication technologies and communication protocols may be used for this purpose. A few example communication technologies can include cellular technologies (5G, for example) and packet switching technologies. A few example communication protocols can include a vehicle-to-everything (V2X) protocol, a vehicle-to-infrastructure (V2I) protocol, a dedicated short-range communications (DSRC) protocol, a Wi-fi protocol, a Bluetooth® protocol, and/or a machine-to-machine protocol.

In another example implementation, the collision avoidance system 135 may communicate directly with the supervisory computer 150 without use of the network 140. A few example communication technologies that may be used for this purpose can include Wi-Fi, Bluetooth®, Ultra-Wideband (UWB), Zigbee®, and Li-Fi (light-based communication).

The network 140 may include any one or combination of networks, such as a local area network (LAN), a wide area network (WAN), a telephone network, a cellular network, a cable network, a wireless network, and/or private/public networks such as the Internet. In some instances, the network 140 may support communication technologies such as Bluetooth®, cellular, near-field communication (NFC), Wi-Fi, Wi-Fi direct, machine-to-machine communication, and/or man-to-machine communication.

The sensor system of the vehicle 130 can be provided in any of various forms such as, for example, an image capture system, a movement sensor, a radar detector, a sonar detector, an infrared sensor, a thermal imager, and/or a light detection and ranging (LIDAR) system. In one case, where the vehicle 130 is a driver-operated vehicle, the sensor system can cooperate with the vehicle controller to provide a warning signal to a driver of the vehicle 130 in order to prevent a collision between the vehicle 130 and an object in the travel path of the vehicle 130. The warning signal may be provided in various forms such as, for example, an audible signal propagated out of a sound system of the vehicle 130, and/or real-time video displayed on a display screen of an infotainment system of the vehicle 130.

In another case, where the vehicle 130 is an autonomous vehicle, the sensor system can provide data to the vehicle controller of the vehicle 130 that assists the vehicle controller maneuver the vehicle 130 to avoid colliding with an object in the travel path of the vehicle 130.

The supervisory computer 150 can be any of various types of computers configured to communicate via the network 140 with the collision avoidance system 135 and other devices such as, for example, an object detector 105 mounted on an exterior portion of a building 106, an object detector 110 mounted on a roadside fixture 111, and a personal communication device carried by an individual 120. Some examples of the roadside fixture 111 can include a traffic signal post, a street lamp, and a telecommunication system enclosure. The object detector 105 and/or the object detector 110 can be provided in any of various forms such as, for example, an image capture system (a video camera or a digital camera, for example), a movement sensor, a radar detector, a sonar detector, an infrared sensor, a thermal imager, and/or a LIDAR system.

In an example implementation, where the object detector 105 and/or the object detector 110 is implemented in the form of a camera, the camera is configured to capture images of objects located inside a pre-defined detection coverage area. The images may be captured in the form of video on a continuous basis (similar to a closed-circuit television (CCTV) camera) and/or in the form of images upon detection of movement inside the detection coverage area (similar to a security camera). The captured images can be transmitted to the supervisory computer 150 via a wireless communication link, a wired communication link, and/or an optical communication link, in any of various compressed and/or non-compressed formats (raw images, MP3, MP4, etc.). Object detector devices other than a camera, such as a movement sensor, a radar detector, a sonar detector, an infrared sensor, a thermal imager, or a LIDAR system may transmit signals and/or digital data (instead of images) to the supervisory computer 150.

In the example scenario illustrated in FIG. 1, the object detector 105 is configured to capture information of any object that may be present inside a detection coverage area that is defined by a dashed line 107 and a dashed line 108 and to transmit the information to the supervisory computer 150. The information may be transmitted in the form of images when the object detector 105 is an imaging device and in the form of signals and/or data when the object detector 105 is, for example, a device such as a movement sensor, a radar detector, a sonar detector, an infrared sensor, a thermal imager, or a LIDAR system. The supervisory computer 150 may evaluate the information and determine that a dumpster 125 and the individual 120 are located in the alley 165. The supervisory computer 150 may also determine that the dumpster 125 is parked in a manner that causes the dumpster 125 to be an obstacle in a travel path of any vehicle entering the alley 165 and traveling north. Furthermore, the individual 120 is standing behind the dumpster 125 and may be hidden from view of the driver of the vehicle entering the alley 165.

More particularly, the collision avoidance system 135 of the vehicle 130 is unable to detect the dumpster 125 and the individual 120 at a current location of the vehicle 130 (prior to reaching the alley 165). The supervisory computer 150 that is aware of the dumpster 125 and the individual 120 based on information received from the object detector 105, transmits an alert to the collision avoidance system 135 of the vehicle 130 in order to prevent a collision between the vehicle 130 and the dumpster 125. The collision avoidance system 135 of the vehicle 130 may receive the alert from the supervisory computer 150 and issue a warning to a driver of the vehicle 130 (when the vehicle 130 is a driver operated vehicle) or execute a driving maneuver to avoid the collision (when the vehicle 130 is an autonomous vehicle).

In one example implementation, the alert may be provided to the driver of the vehicle 130 in the form of a pictorial representation of the detection coverage area of the object detector 105. The pictorial representation may be, for example, a map that provides location information of the dumpster 125 and/or the individual 120 (depicted as icons in the map). In one case, both the icons may be stationary icons because the supervisory computer 150 has determined that the dumpster 125 and the individual 120 are stationary. In another case, the icon representing the individual 120 may be moving because the supervisory computer 150 has determined that the individual 120 is moving. A movement of the icon on the map may track a movement of the individual 120.

In another example implementation, the alert may be provided to the driver of the vehicle 130 in the form of a three-dimensional (3D) rendering of the detection coverage area of the object detector 105. The 3D rendering may be provided in the form of a live stream video displayed on a display screen of an infotainment system in the vehicle 130.

The dumpster 125 is one example of an inanimate object and the individual 120 is one example of an animate object. An animate object may be distinguished from an inanimate object by including a thermal imaging device in the object detector 105 in order to detect thermal radiation and movement of the animate object.

The supervisory computer 150 may further determine that it is desirable to not only warn the driver of the vehicle 130 but to warn the individual 120 as well in order to prevent harm to the individual 122 as a result of a collision between the vehicle 130 and the individual 120. The alert may be sent to the individual 120 in various ways. In one example case, the alert is an audible alert or a text message transmitted to a personal communication device carried by an individual 120 (a smartphone, for example).

The description above pertains to the object detector 105. The object detector 110 may operate in a manner similar to the object detector 105 and is configured to capture information pertaining to one or more objects present inside a detection coverage area defined by a dashed line 112 and a dashed line 113. In one example implementation in accordance with the disclosure, the detection coverage area of the object detector 110 overlaps the detection coverage area of the object detector 105 (as shown in FIG. 1). In another example implementation in accordance with the disclosure, the detection coverage area of the object detector 110 does not overlap the detection coverage area of the object detector 105.

In the example scenario illustrated in FIG. 1, the object detector 105 captures information about the individual 120 and the dumpster 125, while the object detector 110 captures information about the individual 120, the dumpster 125, and a vehicle 115 that is parked in the alley 165. The object detector 110 transmits information (images, data, signals, etc.) about the individual 120, the dumpster 125, and the vehicle 115, to the supervisory computer 150. The supervisory computer 150 may evaluate the information provided by the object detector 110 and validate a previous determination made by evaluating information provided by the object detector 105 (such as, for example, determining that the dumpster 125 constitutes an obstacle in a travel path of the vehicle 130 and that the individual 120 may be harmed by the vehicle 130 colliding with the individual 120 and/or with the dumpster 125).

The supervisory computer 150 may further determine by evaluating the information received from the object detector 110 that the vehicle 115 may constitute an additional obstacle in the travel path of the vehicle 130. Consequently, the alert provided by the supervisory computer 150 to the collision avoidance system 135 of the vehicle 130 may further provide information about the vehicle 115 so that the vehicle 130 may avoid colliding with the vehicle 115 after avoiding a collision with the dumpster 125 and/or the individual 120.

The supervisory computer 150 may also determine by evaluating the information received from the object detector 110 that the vehicle 115 is in motion and/or has stopped at a red traffic light. Either of these actions can provide an indication that one or more individuals are present in the vehicle 115. If so, the supervisory computer 150 may transmit an alert to a collision avoidance system of the vehicle 115 (and/or to one or more personal communication devices of individuals inside the vehicle 115) to prevent a collision between the vehicle 130 and the vehicle 115. The driver of the vehicle 115 (and/or the collision avoidance system of the vehicle 115) may respond to the alert by executing a preemptive action to avoid the collision (such as, for example, by moving the vehicle 115 away from the alley 165).

Figure 2:
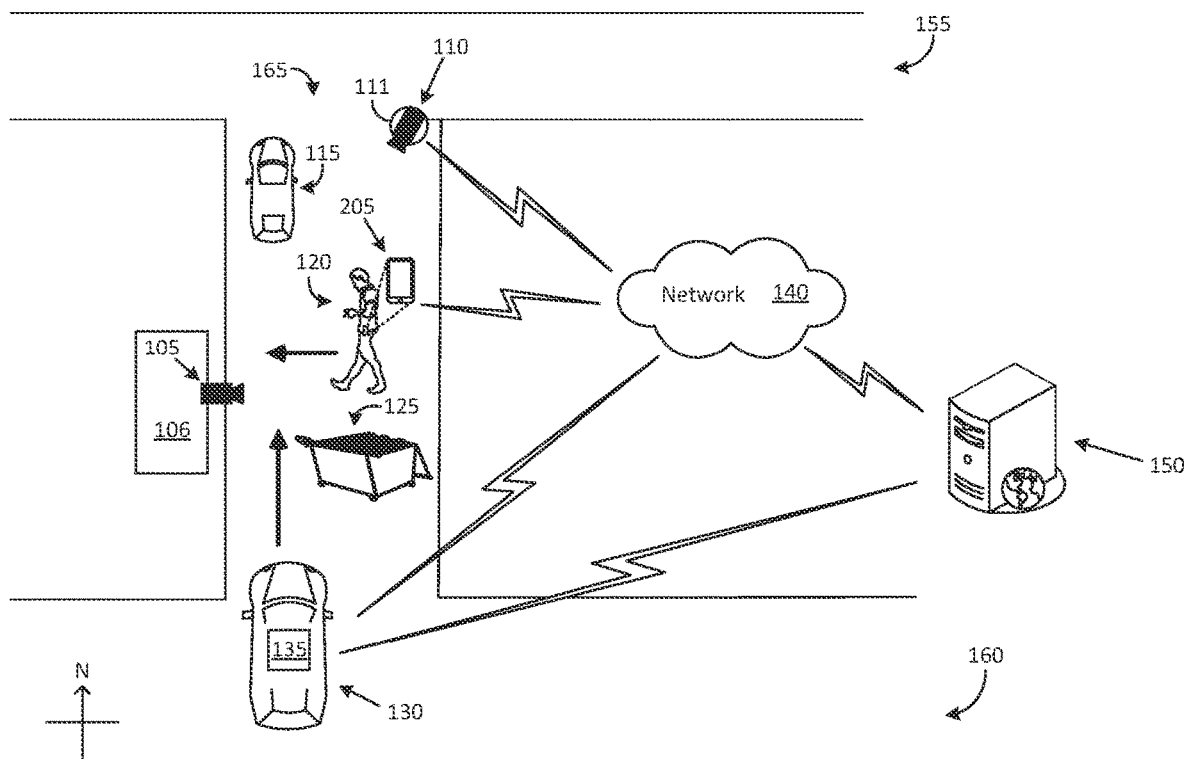
FIG. 2 shows another example scenario in accordance with the disclosure where an object is undetectable by a collision avoidance system of a vehicle.

FIG. 2 shows another example scenario in accordance with the disclosure where one or more objects are undetectable by the collision avoidance system 135 of the vehicle 130. In this example scenario, the objects in the alley 165 are the same as the ones described above—the dumpster 125, the individual 120, and the vehicle 115. However, the vehicle 130 is now located at one end of the alley 165 and is headed north towards the other end of the alley 165. The individual 120 is no longer stationary but is now a pedestrian who is walking west in a preoccupied manner. The vehicle 130 may be hidden from view of the individual 120 by the dumpster 125, and the travel path of the individual 120 may lead to a collision between the vehicle 130 and the individual 120.

The object detector 105 and/or the object detector 110 capture information about the individual 120 and transmit the information to the supervisory computer 150. In an example implementation, the information may be conveyed to the supervisory computer 150 in the form of a real time video. The supervisory computer 150 may evaluate the real time video and determine that the individual 120 is moving. Various parameters associated with the movement of the individual 120 may be determined by the supervisory computer 150 in various ways such as, for example, by evaluating the information provided by the object detector 105, by evaluating the information provided by the object detector 105, by validating information provided by the information the object detector 105 with information provided by the object detector 110 (or vice-versa), and/or supplementing and/or complementing the information provided by the object detector 105 with information provided by the object detector 110 (or vice-versa). Some example parameters that may be determined by the supervisory computer 150 can include real time location updates about the individual 120, a direction of movement of the individual 120, a speed of movement of the individual 120, and a predicted travel path of the individual 120.

The supervisory computer 150 may also communicate with the collision avoidance system 135 of the vehicle 130 to obtain information such as, for example, real time location updates about the vehicle 130, a direction of travel of the vehicle 130, and a speed of travel of the vehicle 130.

The supervisory computer 150 may evaluate the parameters of the individual 120 and the parameters of the vehicle 130 in combination, for various reasons such as, for example, to predict a likelihood of an intersection of the travel path of the individual 120 and the travel path of the vehicle 130 (high likelihood in the illustrated example scenario), a likelihood of a collision between the vehicle 130 and the individual 120, and a predicted time at which the collision may occur.

The supervisory computer 150 may then transmit an alert to the collision avoidance system 135 of the vehicle 130 and/or the individual 120 so as to avert a vehicular mishap. The alert to the collision avoidance system 135 of the vehicle 130 may include a warning about the dumpster 125 and about the individual 120. The collision avoidance system 135 of the vehicle 130 may respond to the warning about the dumpster 125 in various ways such as, for example, by maneuvering the vehicle 130 to one side of the alley 165 and by looking out for oncoming vehicles (traveling south in the alley 165). The collision avoidance system 135 of the vehicle 130 may respond to the warning about the individual 120 in various ways such as, for example, by slowing down a speed of the vehicle 130, activating a horn of the vehicle 130, and/or stopping the vehicle 130 prior to reaching the dumpster 125.

In addition to, or in lieu of, alerting the collision avoidance system 135 of the vehicle 130, the supervisory computer 150 may transmit an alert to the individual 120 in various ways. In an example case, the supervisory computer 150 may transmit an alert to a personal communication device 205 of the individual 120 (a smartphone, for example). The personal communication device 205 may produce an audible warning (buzzing sound, tone, beep, etc.) to warn the individual about the vehicle 130. The individual 120 may respond to the alert by stopping and/or by turning around.

Figure 3:
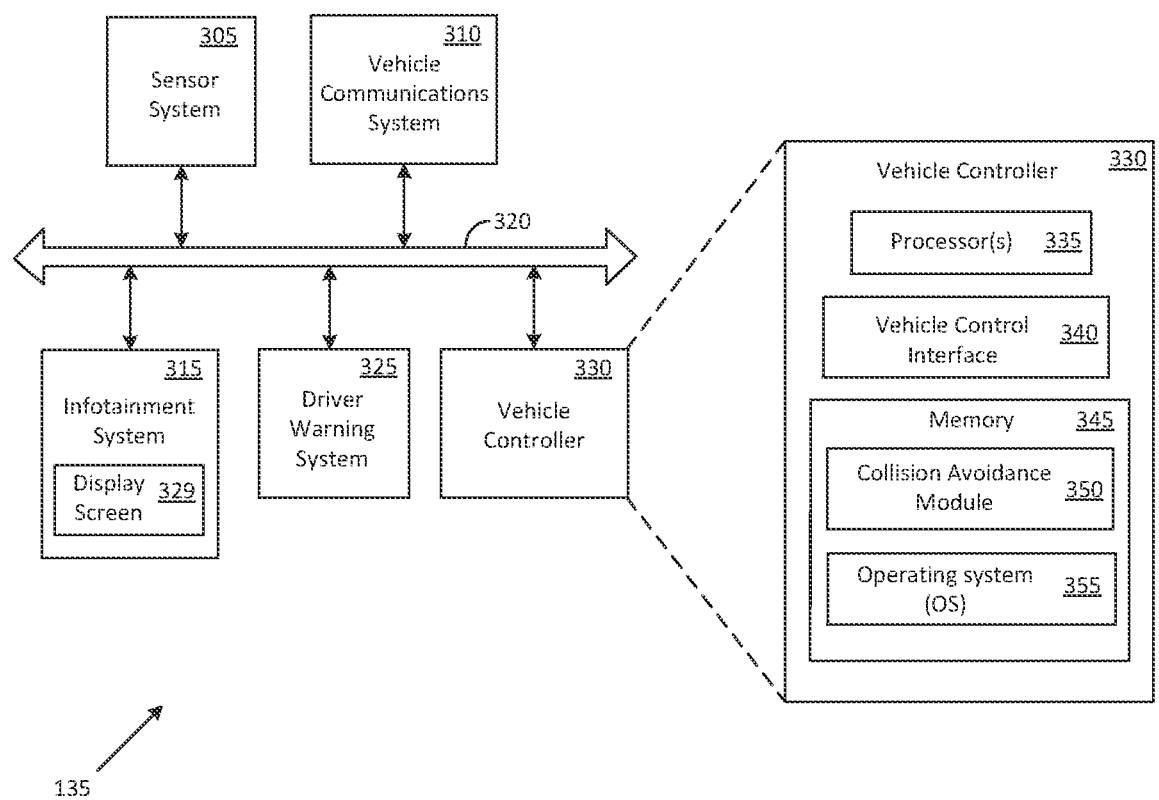
FIG. 3 shows some example components that can be a part of a collision avoidance system of a vehicle in accordance with an embodiment of the disclosure.

FIG. 3 shows some example components that can be a part of the collision avoidance system 135 of the vehicle 130 in accordance with an embodiment of the disclosure. The example components can include a sensor system 305, a vehicle communications system 310, an infotainment system 315, a driver warning system 325, and a vehicle controller 330.

The various components are communicatively coupled to each other via one or more buses such as an exemplary bus 320. The bus 320 may be implemented using various wired and/or wireless technologies. For example, the bus 320 can be a vehicle bus that uses a controller area network (CAN) bus protocol, a Media Oriented Systems Transport (MOST) bus protocol, and/or a CAN flexible data (CAN-FD) bus protocol. Some or all portions of the bus 320 may also be implemented using wireless technologies such as Bluetooth®, Ultra-Wideband, Wi-Fi, Zigbee®, or near-field-communications (NFC). For example, the bus 320 may include a Bluetooth® communication link that allows the vehicle controller 330 to wirelessly communicate with a personal communication device carried by an occupant of the vehicle 130.

The sensor system 305 can be provided in any of various forms such as, for example, an image capture system, a movement sensor, a radar detector, a sonar detector, an infrared sensor, a thermal imager, and/or a LIDAR system. The sensor system 305 can provide information and warning signals to a driver of the vehicle 130 (when the vehicle 130 is a driver-operated vehicle) in various forms such as, for example, real-time video displayed on a display screen of an infotainment system of the vehicle 130 and/or audible signals emitted through a sound system of the vehicle 130. The sensor system 305 can provide data to the vehicle controller 330 of the vehicle 130 (when the vehicle 130 is an autonomous vehicle) that assists the vehicle controller 330 maneuver the vehicle 130 to avoid colliding with an obstacle in the travel path of the vehicle 130.

The vehicle communications system 310 may include a wireless transceiver that allows the collision avoidance system 135 to transmit/receive information to/from the supervisory computer 150. In an example implementation, the wireless transceiver may allow the collision avoidance system 135 to communicate with the supervisory computer 150 using an Internet communications format (when the network 140 is the Internet) and/or a cellular communications format (when the network 140 is a cellular network). In another example implementation, the wireless transceiver may allow the collision avoidance system 135 to directly communicate with the supervisory computer 150 using one or more of various communication protocols such as, for example, a vehicle-to-everything (V2X) protocol, a vehicle-to-infrastructure (V2I) protocol, a dedicated short-range communications (DSRC) protocol, a Wi-fi protocol, a Bluetooth protocol, an Ultra-Wideband (UWB) protocol, and/or a Zigbee protocol.

The infotainment system 315 may include a display screen 329 that can display alerts/warnings to a driver of the vehicle 130 (when the vehicle 130 is a driver-operated vehicle) so the driver may take action to prevent a vehicular mishap.

The driver warning system 325 is an optional item that may be included in the vehicle 130 when the vehicle 130 is a driver-operated vehicle and may be omitted when the vehicle 130 is an autonomous vehicle. In one example case, the driver warning system 325 to emit an audible signal (tone, buzz, beep, etc.) that warns the driver of the vehicle 130 to take preventive action to avoid a vehicular mishap.

The vehicle controller 330 can include a processor 335, a vehicle control interface 340, and a memory 345. The memory 345, which is one example of a non-transitory computer-readable medium, may be used to store an operating system (OS) 355 and code modules such as a collision avoidance module 350. The code modules are provided in the form of computer-executable instructions that can be executed by the processor 335 for performing various operations in accordance with the disclosure.

The vehicle control interface 340 is configured to allow the vehicle controller 330 to control various operations of the vehicle 130 (fuel injection, speed control, braking, cruise control, etc.) either directly (when the vehicle 130 is an autonomous vehicle) or indirectly (by providing assistance to a driver of the vehicle 130 when the vehicle 130 is a driver-operated vehicle). Towards this end, the vehicle control interface 340 may interact with various hardware components of the vehicle 130, such as, for example, an engine controller, a brake pedal, an accelerator pedal, and an engine operating sensor.

The collision avoidance module 350 may be executed by the processor 335 for performing operations in accordance with the disclosure, such as, for example, providing information to the supervisory computer 150, and responding to an alert received from the supervisory computer 150 (via the vehicle communications system 310) in order to avoid a collision.

Figure 4:
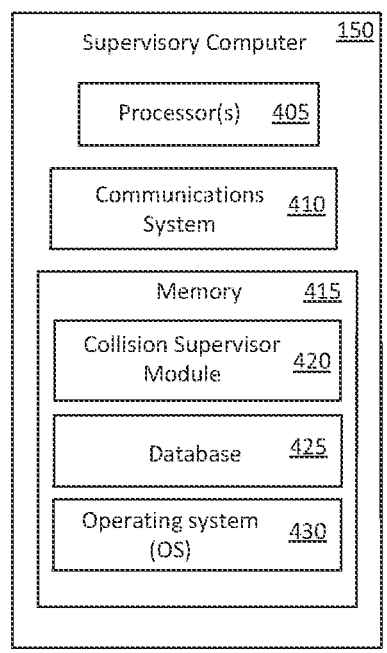
FIG. 4 shows some example components that can be a part of a supervisory computer in accordance with an embodiment of the disclosure.

FIG. 4 shows some example components that can be a part of the supervisory computer 150 in accordance with an embodiment of the disclosure. The supervisory computer 150 can include a processor 405, a communications system 410, and a memory 415. The memory 415, which is another example of a non-transitory computer-readable medium, may be used to store an OS 430 and code modules such as a collision supervisor module 420. The code modules are provided in the form of computer-executable instructions that can be executed by the processor 405 for performing various operations in accordance with the disclosure. The memory 415 may also include a database 425 for storing some types of information that may be accessed by the processor 405 when executing the collision supervisor module 420.

The communications system 410 may include hardware that permits the supervisory computer 150 to communicate with various devices such as the collision avoidance system 135 of the vehicle 130, the object detector 105, the object detector 110, and the personal communication device 205 carried by the individual 120. In an example implementation, the communications system 410 may allow the supervisory computer 150 to communicate with the collision avoidance system 135 of the vehicle 130, the object detector 105, and/or the object detector 110 using an Internet communications format (when the network 140 is the Internet) and/or with the personal communications device 205 using a cellular communications format (when the network 140 is a cellular network). Other communication protocols may be employed to render the supervisory computer 150 compatible with various other devices that are communicatively coupled to the supervisory computer 150.

The collision supervisor module 420 may be executed by the processor 405 for performing operations in accordance with the disclosure, such as, for example, receiving information from, and transmitting information/alerts to, various devices such as the collision avoidance system 135 of the vehicle 130, the object detector 105, the object detector 110, and the personal communication device 205 carried by the individual 120.

Various techniques may be used for performing such operations. For example, in one implementation, the collision supervisor module 420 may be executed in a near-real-time mode of operation to identify and classify one or more objects that may be present in the alley 165. Various object classification and detection algorithms and/or models may be employed for this purpose, such as, for example, an object classification algorithm, a learning algorithm, a you-only-look-once (YOLO) algorithm, and a single shot multiblock detection (SSD) model. Moving objects may be tracked in various ways such as, for example, by employing Simple Online and Realtime Tracking (SORT) and/or deep learning SORT (DeepSORT). The tracking may be executed on a frame-by-frame basis for characterizing different actions performed by a moving object (such as, for example, the individual 120 crossing the alley 165 without looking around).

Various types of path prediction algorithms such as, for example, Long Short Term Memory (LSTM), Gated Recurrent Unit (GRU), Multi Modal (MML), and Optical Flow, may be employed for predicting a travel path of a moving object. The movement of some objects such as animals and humans can be random and unpredictable at times. In such cases, pose detection data and/or historical movement data may be used to predict a travel path of such objects. At least some of the historical data may be gathered over a period of time and stored in the database 425, or can be fetched by the processor 405 from other storage elements (such as, for example, a cloud-based storage element). In an example application, the stored historical data can include text, timestamps, and/or GPS locations. In some cases, a predicted travel path may be based on a limited travel area or a direction of travel basis. For example, areas such as a sidewalk or a patio, may be excluded when predicting a travel path of the vehicle 130.

Other forms of historical data such as, for example, a historical traffic pattern, may be used to identify one or more conditions in the alley 165, including vehicle entry patterns, vehicle exit patterns, vehicle movement patterns, vehicle stopping pattern, vehicle stopping locations, and/or stoppage durations. In some implementations, such data may be conveyed by the supervisory computer 150 to the collision avoidance system 135 of the vehicle 130. The collision avoidance system 135 may use the data to maneuver the vehicle 130 in various ways, such as, for example, to slow down or watch out for other vehicles at certain locations and/or at certain times.

In an example scenario, the alley 165 may be fully or partially blocked by a delivery truck between 5 AM and 6 AM hour on Mondays and Fridays every week. The collision avoidance system 135 may access the database 425 to obtain this information and chart an alternative route at these times (rather than travel through the alley 165).

Alerts generated by the processor 335 upon execution of the collision supervisor module 420 may be transmitted out of the supervisory computer 150 by the communications system 410. The alerts may be tailored in accordance with the recipient device. A first example alert that is sent out to the vehicle 130 (when the vehicle 130 is a driver-operated vehicle) may be tailored to inform the vehicle controller 330 to transmit a haptic signal via the steering wheel and/or brakes of the vehicle 130, for example. A second example alert may be provided in the form of a sound or a message that is broadcast through speakers of the driver warning system 325 of the vehicle 130 (such as, for example, "Watch out for obstacle ahead" or "Alley is blocked."). A third example alert may be provided in the form of an image or a video clip displayed on the display screen 329 of the infotainment system 315 in the vehicle 130. The image or video clip can display one or more objects such as the dumpster 125 and/or the individual 120.

Alerts generated by the processor 335 upon execution of the collision supervisor module 420 may also be transmitted out of the supervisory computer 150 by the communications system 410 to the personal communication device 205 of the individual 120. The alert may be provided in the form of a haptic vibration or a beep, for example, when the personal communication device 205 is a smartwatch or a smartphone. In some cases, the individual 120 may not be wearing a smartwatch or carrying a smartphone. In such cases, the alert may be sent to an appropriate roadside fixture, such as for example, a streetlight that may produce a flashing light to warn the individual 120 of the vehicle 130 and/or a traffic sign that displays a message to warn the individual 120 of the vehicle 130.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed by a processor, such as the processor 335 and the processor 405, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 345 and the memory 415, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM. EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   operating a first object detector having a first detection coverage area;
   detecting, by the first object detector in the first detection coverage area, a first object that is undetectable by a collision avoidance system of a vehicle, wherein the first object is a pedestrian having a personal communication device;
   evaluating information about the first object, wherein evaluating the information about the first object comprises applying an object classification algorithm and/or a learning algorithm to identify the first object;
   conveying, to the collision avoidance system of the vehicle based on evaluating the information about the first object, a first alert to prevent a collision between the vehicle and the first object, wherein the first alert comprises displaying a three-dimensional rendering of the first detection coverage area to a driver of the vehicle;
   conveying, to the personal communication device of the pedestrian a second alert in order to prevent the collision between the vehicle and the pedestrian;
   operating a second object detector having a second detection coverage area;
   detecting, by the second object detector in the second detection coverage area, a second object that is undetectable by the collision avoidance system of the vehicle; and
   conveying, to the collision avoidance system of the vehicle based on evaluating additional information about the second object, a third alert to prevent a collision between the vehicle and the second object after the vehicle has avoided a collision with the first object.

2. The method of claim 1, wherein the first object is an animate object, and wherein the information about the first object comprises a location of the first object and/or a direction of travel of the first object.

3. The method of claim 1, further comprising:
   operating the second object detector having the second detection coverage area that overlaps the first detection coverage area;
   detecting, by the second object detector in the first detection coverage area, the first object that is undetectable by the collision avoidance system of the vehicle; and
   validating the first alert by evaluating additional information about the first object; and
   conveying, to the collision avoidance system of the vehicle after validating by evaluating the additional information about the first object, the first alert to prevent the collision between the vehicle and the first object.

4. The method of claim 1, wherein the first object detector is an imaging device, and wherein the first alert conveyed to the collision avoidance system of the vehicle comprises a map of the first detection coverage area, the map including the first object located in the first detection coverage area.

5. The method of claim 1, wherein the first detection coverage area is a first section of an alley and the second detection coverage area is a second section of the alley, and wherein the first alert comprises a pictorial representation of the first detection coverage area, the second detection coverage area, the first object located in the first detection coverage area, and the second object located in the second detection coverage area.

6. The method of claim 1, wherein evaluating the information about the first object comprises:
   determining, over a period of time, one of a movement pattern of the first object or a pattern of placement of the first object at a first location in the first detection coverage area.

7. The method of claim 1, further comprising:
   conveying, to the collision avoidance system of the vehicle, historic data about traffic movement in the first detection coverage area; and
   evaluating, by the collision avoidance system, the historic data to prevent the collision between the vehicle and the first object.

8. The method of claim 1, further comprising:
   determining, via a thermal imaging device, that the first object is an animate object.

9. A method comprising:
   receiving, by a vehicle, from a supervisory computer, a first alert, the first alert based on evaluating by the supervisory computer, information about a first object detected by a first object detector mounted on one of a building or a roadside fixture, wherein the first object is a pedestrian undetectable by a collision avoidance system of the vehicle, and wherein the first object is identified by applying an object classification algorithm and/or a learning algorithm to identify the first object;
   preventing, by one of the collision avoidance system of the vehicle or a driver of the vehicle, a collision between the vehicle and the first object, based on the first alert, wherein the first alert comprises displaying a three-dimensional rendering of the first object to the driver of the vehicle;
   receiving, by the vehicle, from the supervisory computer, a second alert, the second alert based on evaluating by the supervisory computer, information about a second object detected by a second object detector having a detection coverage area, wherein the second object is undetectable by the collision avoidance system of the vehicle;

conveying, to the collision avoidance system of the vehicle based on evaluating additional information about the second object, a second alert to prevent a collision between the vehicle and the second object after the vehicle has avoided a collision with the first object; and conveying, to a personal communication device of the pedestrian, by the supervisory computer, a third alert in order to prevent a collision between the vehicle and the pedestrian.

10. The method of claim 9, wherein the first object detector comprises an infrared camera and wherein the method further comprises:

distinguishing, by the supervisory computer, an inanimate object from an animate object by evaluating data provided by the infrared camera to the supervisory computer.

11. The method of claim 9, wherein the information about the first object comprises a direction of travel of the pedestrian, the method further comprising:

executing, by the supervisory computer, a path prediction procedure to determine the direction of travel of the pedestrian.

12. The method of claim 11, wherein the vehicle is an autonomous vehicle and the method further comprises:

determining, by the collision avoidance system, a travel path based on the direction of travel of the pedestrian, to avoid a collision between the pedestrian and the autonomous vehicle.

13. The method of claim 9, wherein the vehicle is a driver-operated vehicle, and wherein the method further comprises:

warning the driver of the vehicle through a buzzer in the vehicle, a haptic transducer in the vehicle, and/or an infotainment system in the vehicle.

14. A vehicle comprising:

a collision avoidance system comprising a vehicle controller and a sensor system, the vehicle controller comprising:

a memory that stores computer-executable instructions; and a processor configured to access the memory and execute the computer-executable instructions to:

receive, from a supervisory computer, a first alert, the first alert based on evaluating by the supervisory computer, information about a first object detected by a first object detector, mounted on one of a building or a roadside fixture, wherein the first alert comprises displaying a three-dimensional rendering of the object to a driver of the vehicle, and wherein the first object is identified by applying an object classification algorithm and/or a learning algorithm to identify the first object;

determine that the first object is a pedestrian undetectable by the sensor system of the vehicle;

execute a preventive action to prevent a collision between the vehicle and the first object, based on the information about the first object;

receive, from the supervisory computer, a second alert, the second alert based on evaluating by the supervisory computer, information about a second object detected by a second object detector having a detection coverage area, wherein the second object is undetectable by the collision avoidance system;

convey, to the collision avoidance system based on evaluating additional information about the second object, a second alert to prevent a collision between the vehicle and the second object after the vehicle has avoided a collision with the first object; and conveying, to a personal communication device of the pedestrian, by the supervisory computer, a third alert in order to prevent a collision between the vehicle and the pedestrian.

15. The vehicle of claim 14, wherein the information about the first object is a direction of travel of the pedestrian, and wherein the processor executes additional computer-executable instructions to:

determine, based on the direction of travel of the pedestrian, the preventive action to be performed in order to avoid a collision between the vehicle and the pedestrian.

16. The vehicle of claim 15, wherein the vehicle is a driver-operated vehicle, and wherein the preventive action comprises providing a warning through a buzzer in the vehicle, a haptic transducer in the vehicle, and/or an infotainment system in the vehicle.

17. The vehicle of claim 15, wherein the vehicle is an autonomous vehicle, and wherein the preventive action comprises executing a driving maneuver to avoid the collision between the autonomous vehicle and the pedestrian.

* * * * *